United States Patent
Nakagawa

(10) Patent No.: US 9,143,205 B2
(45) Date of Patent: Sep. 22, 2015

(54) DATA TRANSMISSION DEVICE AND DATA TRANSMISSION METHOD

(75) Inventor: Yoshihiro Nakagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 854 days.

(21) Appl. No.: 12/677,991

(22) PCT Filed: Sep. 11, 2008

(86) PCT No.: PCT/JP2008/066406
§ 371 (c)(1),
(2), (4) Date: Mar. 12, 2010

(87) PCT Pub. No.: WO2009/035028
PCT Pub. Date: Mar. 19, 2009

(65) Prior Publication Data
US 2010/0254481 A1  Oct. 7, 2010

(30) Foreign Application Priority Data
Sep. 12, 2007  (JP) .................. 2007-236954

(51) Int. Cl.
*H04B 5/02* (2006.01)
*H04B 5/00* (2006.01)
*H04B 10/00* (2013.01)

(52) U.S. Cl.
CPC .............. *H04B 5/02* (2013.01); *H04B 5/0081* (2013.01); *H04B 5/0093* (2013.01); *H04B 10/00* (2013.01)

(58) Field of Classification Search
CPC ........ H04B 5/02; H04B 10/00; H04B 5/0081; H04B 5/0093
USPC .................. 375/295; 455/41.1; 178/43, 46, 48
See application file for complete search history.

(56) References Cited

FOREIGN PATENT DOCUMENTS

| JP | H07-221260 A | | 8/1995 | |
|----|---|---|---|---|
| JP | 08-23356 | * | 1/1996 | .............. H04L 25/49 |
| JP | H08-23356 A | | 1/1996 | |
| JP | H08-236696 A | | 9/1996 | |
| JP | WO2007029435 | * | 3/2007 | .............. H04B 5/00 |
| WO | 2007/029435 A | | 3/2007 | |

OTHER PUBLICATIONS

Translation of JP 08-23356.*
International Search Report for PCT/JP2008/066406, mailed Dec. 16, 2008.
N. Miura et al, "Analysis and Design of Transceiver Circuit and Inductor Layout for Inductive Inter-ship Wireless Superconnect", IEEE 2004 Symposium on VLSI Circuits Digest of Technical Papers, pp. 246-249.

* cited by examiner

*Primary Examiner* — Daniel Washburn
*Assistant Examiner* — Eboni Hughes
(74) *Attorney, Agent, or Firm* — Sughrue Mion, PLLC

(57) ABSTRACT

A data transmission device comprises a data sending device that includes an electromagnetic signal sending unit. The data sending device is configured to output binary data in such a polarity that an electromagnetic signal, which is output from the electromagnetic signal sending unit, is substantially point symmetric with a point, at which amplitude of the electromagnetic signal crosses 0, as a symmetric point. Binary data is output corresponding to whether a gradient at the symmetric point is positive or negative.

17 Claims, 17 Drawing Sheets

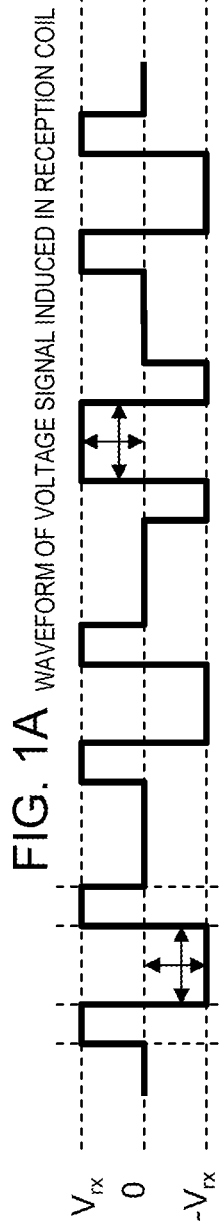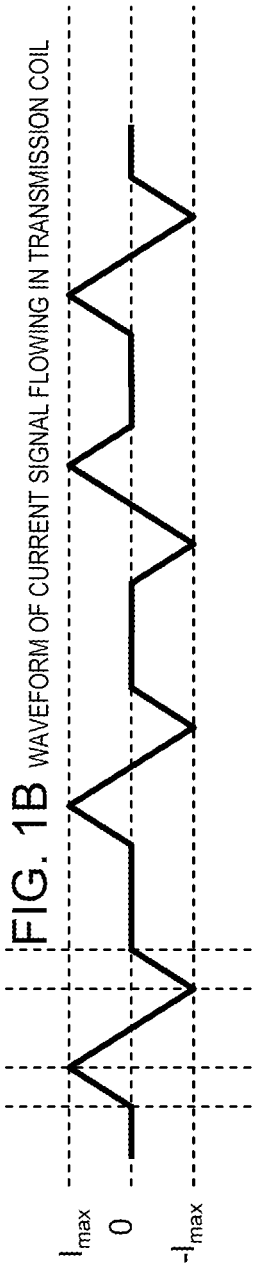
FIG. 1A WAVEFORM OF VOLTAGE SIGNAL INDUCED IN RECEPTION COIL
FIG. 1B WAVEFORM OF CURRENT SIGNAL FLOWING IN TRANSMISSION COIL

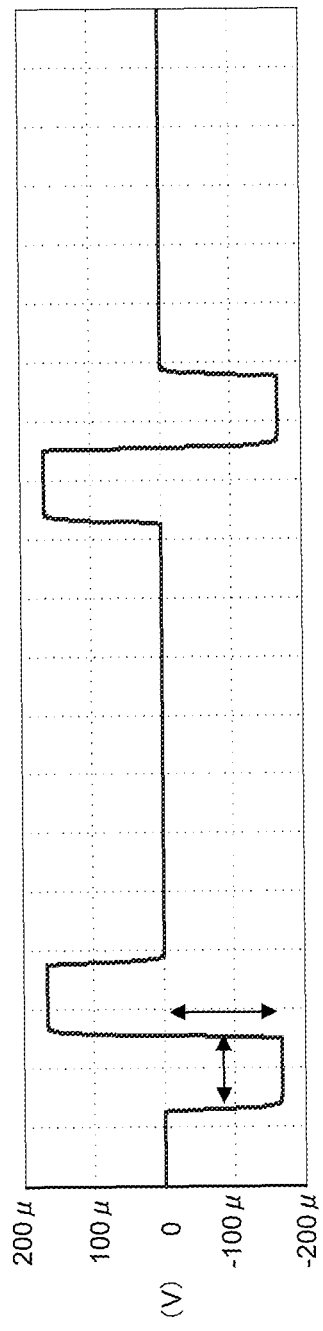
FIG. 2A  RELATED ART
WAVEFORM OF VOLTAGE SIGNAL INDUCED IN RECEPTION COIL
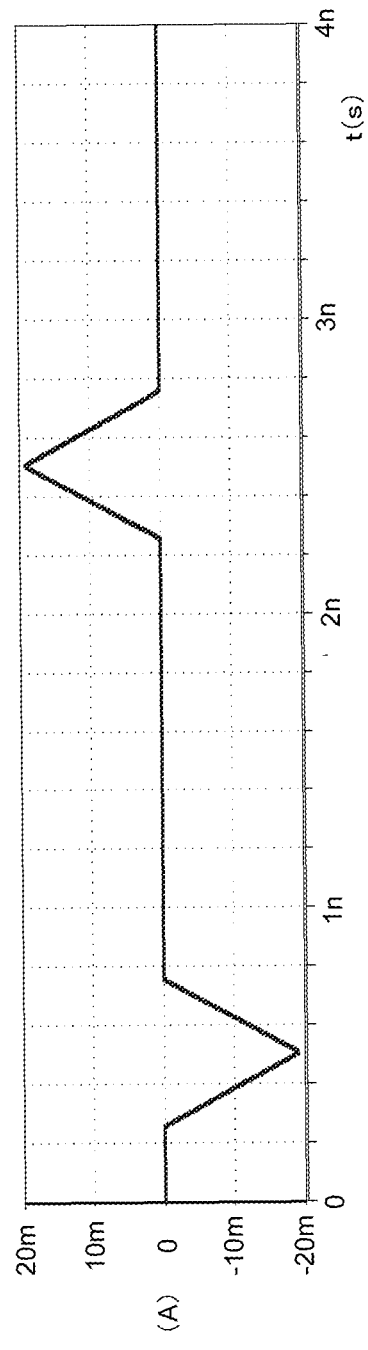
FIG. 2B  WAVEFORM OF CURRENT SIGNAL FLOWING IN TRANSMISSION COIL
RELATED ART

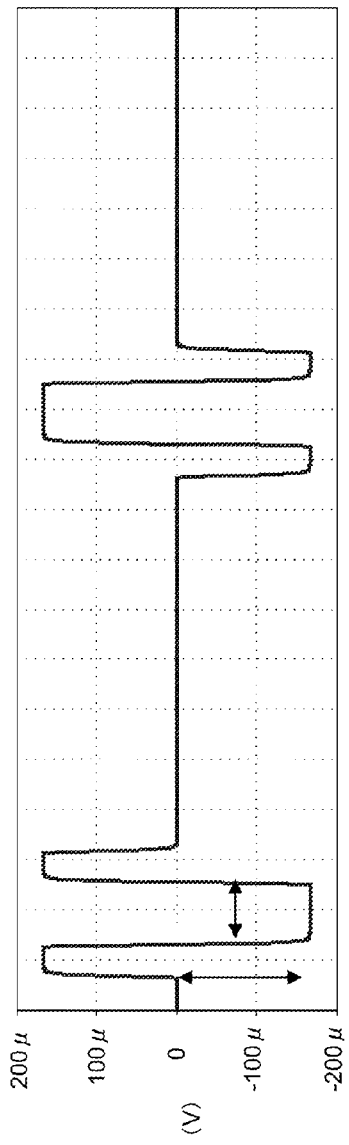
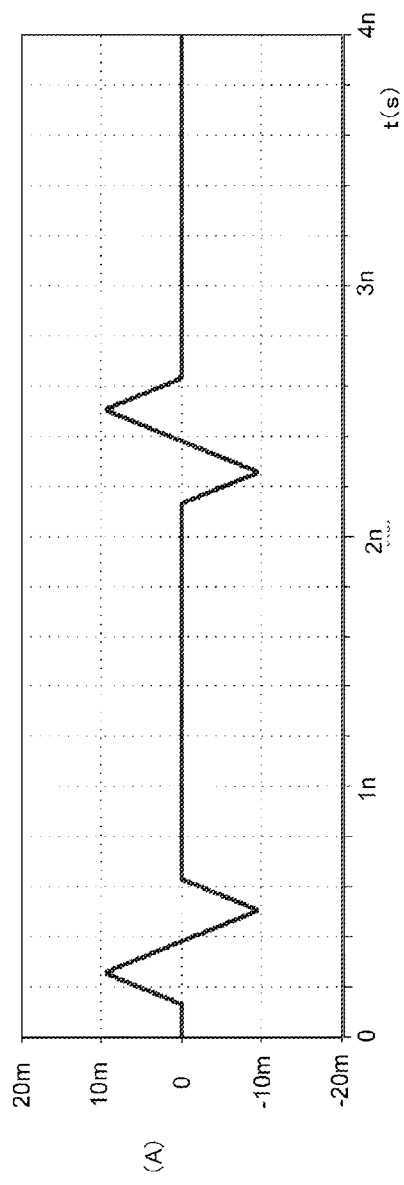

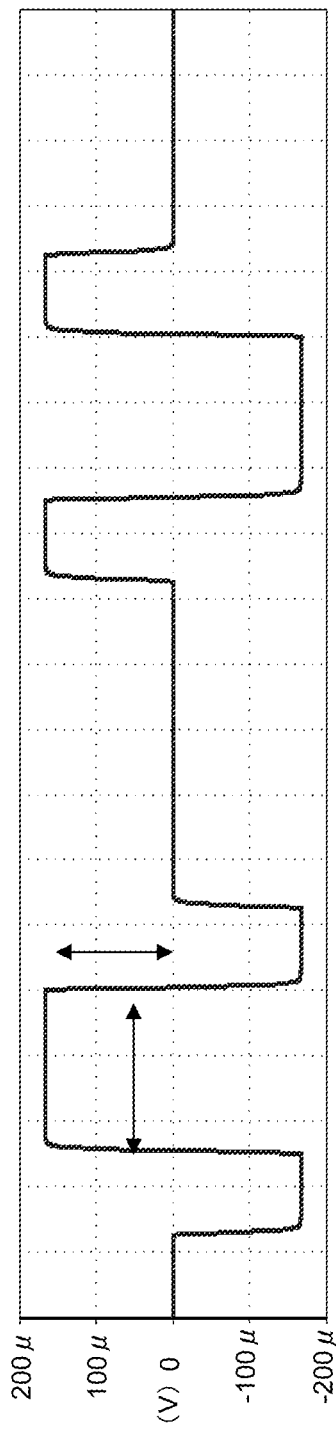
FIG. 4A  WAVEFORM OF VOLTAGE SIGNAL INDUCED IN RECEPTION COIL
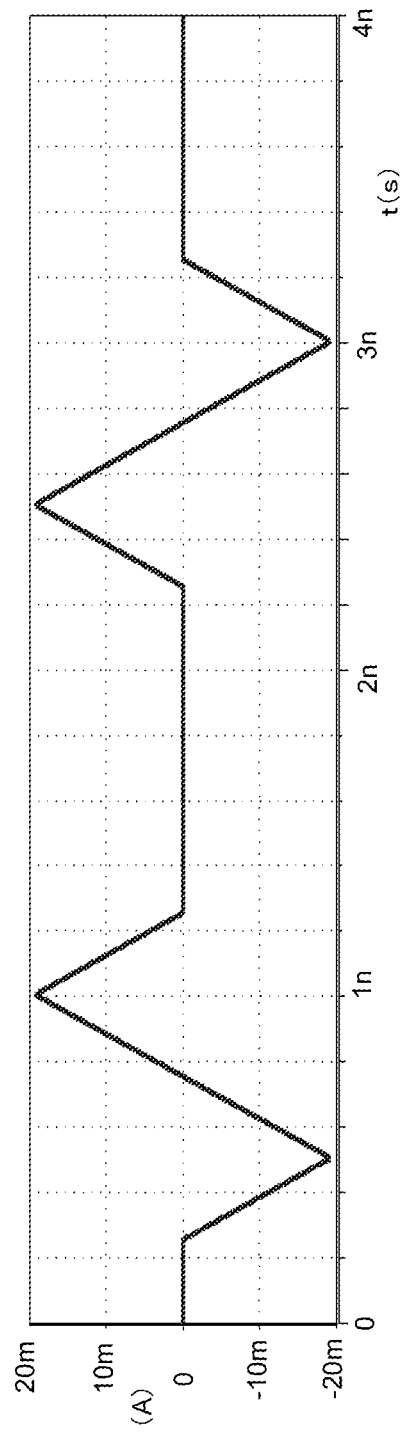
FIG. 4B  WAVEFORM OF CURRENT SIGNAL FLOWING IN TRANSMISSION COIL

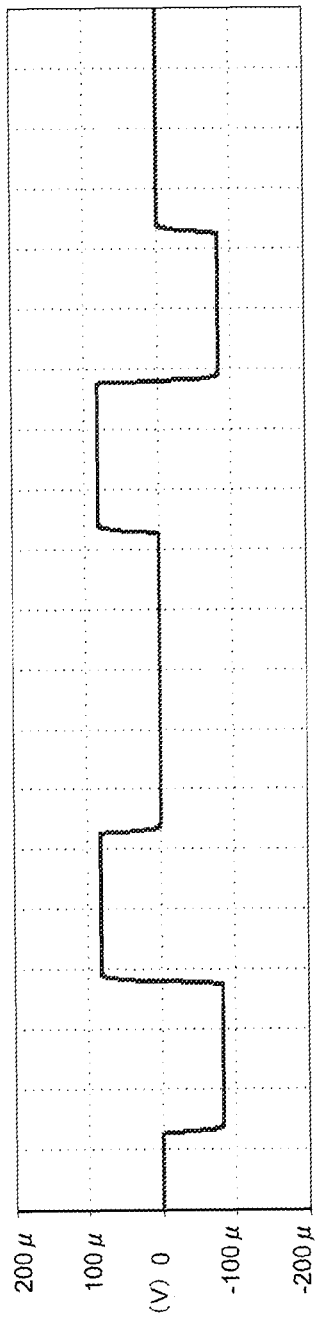
FIG. 5A  RELATED ART
WAVEFORM OF VOLTAGE SIGNAL INDUCED IN RECEPTION COIL
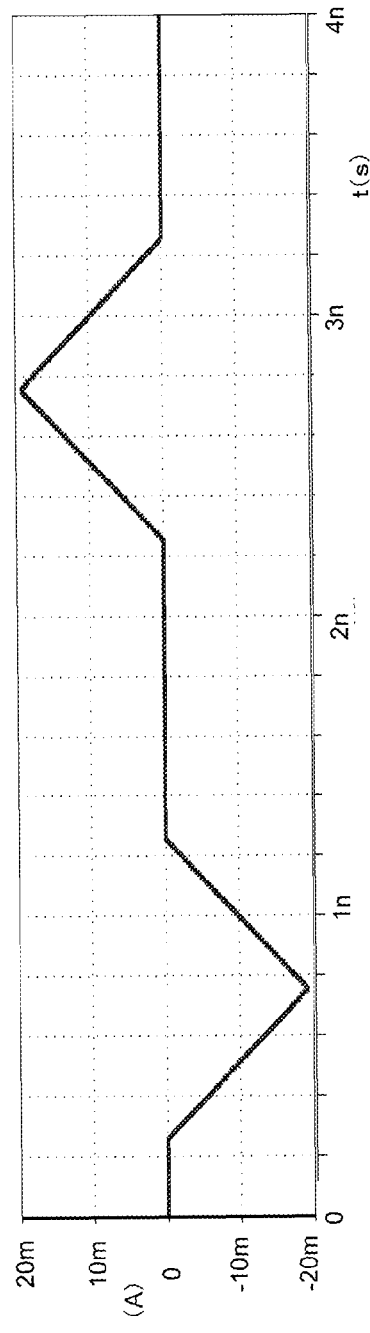
FIG. 5B  WAVEFORM OF CURRENT SIGNAL FLOWING IN TRANSMISSION COIL
RELATED ART

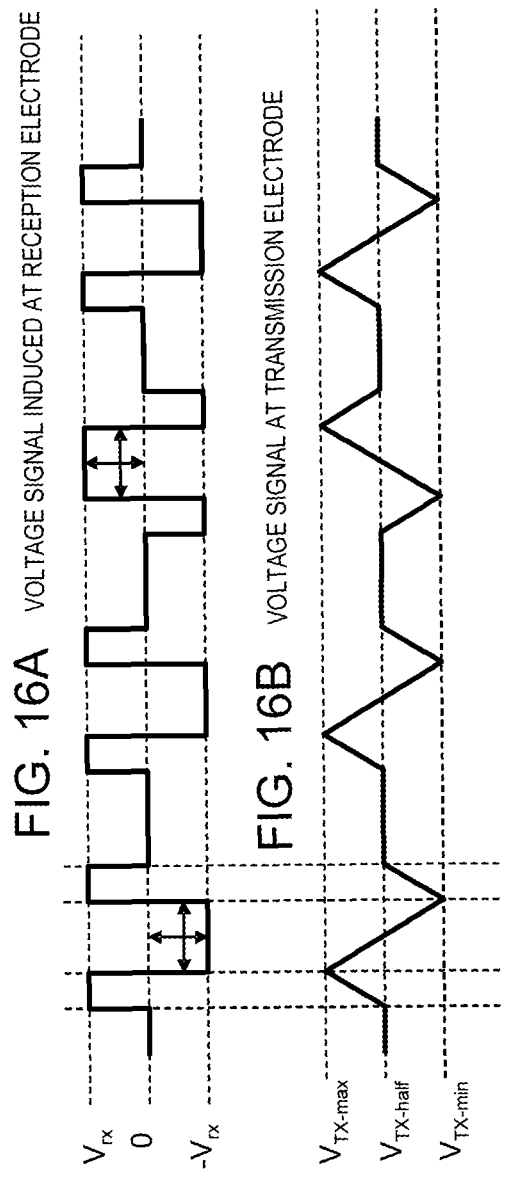

DATA TRANSMISSION DEVICE AND DATA TRANSMISSION METHOD

The present application is the National Phase of PCT/JP2008/066406, filed on Sep. 11, 2008, which claims priority from Japanese Patent Application 2007-236954 (filed on Sep. 12, 2007) the content of which is hereby incorporated in its entirety by reference into this description.

TECHNICAL FIELD

The present invention relates to a data transmission device and a data transmission method, and more particularly to a technology for transmitting data through electromagnetic induction.

BACKGROUND

Recently, as the density of circuits incorporated into a semiconductor device is increased, a semiconductor device is known that performs data transmission through electromagnetic induction between coils each formed on each of multiple laminated semiconductor chips. On such a semiconductor device, a coil formed on one of semiconductor chips generates a magnetic field signal that induces a signal, proportional to a differential value of a current signal that is input to the transmission coil, in a coil formed on another semiconductor chip. This induced signal is received to perform signal transmission between chips in non-contact mode.

For example, Patent Document 1 describes an integrated circuit device in which two or more circuit chips, each of which forms an integrated circuit, are laminated and the integrated circuits formed on the circuit chips are electromagnetically coupled by electromagnetic induction coils. Patent Document 2 describes a signal transmission device, which is a three-dimensional integrated circuit composed of vertically laminated integrated circuit chips, for transmitting a signal through induction using the coupling inductance M between one part of the vertically integrated circuit in one chip layer Ln and the other part of the vertically integrated circuit in another chip layer Ln+x. In addition, Non-Patent Document 1 describes a semiconductor device in which multiple semiconductor chips are laminated, the coils formed on the semiconductor chips are vertically arranged one on top of the other in the same position, and the transmission circuit and the reception circuit are arranged near the coils for signal transmission between the upper semiconductor chip and the lower semiconductor chip.

In the devices described above, the waveform of the current signal flowing in the transmission coil is a steep, narrow pulse-width waveform similar to that of a signal that flows only at rise time and fall time of a rectangular wave that is input to the transmission device. On the other hand, because differential value of the input magnetic field is induced as a voltage in the reception coil according to the Faraday's law of induction, a differential signal of the current signal waveform flowing in the transmission coil is induced. As a result, the voltage signal having a narrow pulse-width, steep peak is input to the reception device.

Normally, there are various noise sources inside and outside a semiconductor device. For example, a semiconductor chip includes many logic circuits, and the signal transmission among the circuits is performed by the charge and discharge of a capacitor at the input of a reception circuit. It is known that the current that flows at that time has a waveform very similar to the waveform of the current signal flowing in the transmission coil described above. If a current having this waveform is introduced into the reception coil as a noise, it is very difficult in principle to separate between the noise and the reception signal because the voltage signal generated by the noise is very similar to the voltage signal based on the regular reception signal induced in the reception coil.

To solve this problem, Patent Document 3 discloses a transmission method and an interface circuit that are noise-resistant and, even if a noise is introduced, transmit signals without being affected by the noise. The method described in Patent Document 3 supplies the driving voltage waveform, such as the one shown in FIG. 17A, to the transmission coil. On the other hand, the magnetic field signal, which is output from the transmission coil, is a triangular wave or an almost triangular wave as shown in FIG. 17B, and the voltage waveform induced in the reception coil shown in FIG. 17C may be changed to a reception signal having a wide pulse-width waveform. As a result, the signal may be distinguished clearly from a noise signal that has a narrow-width voltage waveform.

Patent Document 1:
  Japanese Patent Kokai Publication No. JP-H07-221260A
Patent Document 2:
  Japanese Patent Kokai Publication No. JP-H08-236696A
Patent Document 3:
  International Publication WO07/029435A1
Non-Patent Document 1:
  Noriyuki Miura, et al., "Analysis and Design of Transceiver Circuit and Inductor Layout for Inductive Inter-chip Wireless Superconnect", IEEE 2004 Symposium on VLSI Circuits Digest of Technical Papers, pp. 246-249(2004).

SUMMARY

The following analysis is given by the present invention.

As described above, the signal induced in the reception coil is the differential value of the current signal flowing in the transmission coil. Therefore, to stably receive the signal, it is preferable that the signal induced in the reception coil has sufficient amplitude and sufficient time-direction width. That is, it is desirable that the amount of change per unit-time in the current flowing in the transmission coil be increased and that the change-duration be increased. However, an attempt to satisfy this condition in the conventional art will result in an increase in the power consumption of the transmitter.

In an actual signal transmission system where there is a limit on the power supply voltage and this limitation, in turn, limits the maximum amount of current that may be supplied to the transmission coil, it is impossible to flow the current for a long time continuously. This prevents the width of the signal, generated in the reception coil, from being increased enough and, when the signal is deviated in the time direction or the operation of the reception circuit is off-set in timing, there is a possibility that data cannot be transmitted correctly.

It is an object of the present invention to provide a data transmission device and a data transmission method that transmit data correctly by increasing the strength of the signal induced in the reception coil and the time-direction width of the signal.

A data transmission device in one aspect of the present invention comprises a data sending device that includes an electromagnetic signal sending unit wherein the data sending device is configured to output binary data in such a that an electromagnetic signal, which is output from the electromagnetic signal sending unit, is substantially (approximately) point symmetric with a point, at which amplitude of the electromagnetic signal crosses 0, as a symmetric point and binary data is output corresponding to whether a gradient at the symmetric point is positive or negative.

The data transmission device of the present invention may further comprise a data reception device that includes an electromagnetic signal detection unit wherein the electromagnetic signal sending unit and the electromagnetic signal detection unit are configured to be faced (opposed) and, to perform data transmission through electromagnetic induction in non-contact mode.

The data transmission device of the present invention may be configured such that the binary data is made to correspond to a change in a time differential value of the electromagnetic signal in a zero/positive/negative/positive/zero sequence or in a zero/negative/positive/negative/zero sequence.

The data transmission device of the present invention may be configured such that the data sending device outputs the electromagnetic signal, which has a waveform composed of a combination of substantially (approximately) triangular waves, from the electromagnetic signal sending unit.

The data transmission device of the present invention may be configured such that time differential value of the electromagnetic signal is approximately constant in a negative period when the time differential value of the electromagnetic signal changes in a zero/positive/negative/positive/zero sequence and in a positive period when the time differential value of the electromagnetic signal changes in a zero/negative/positive/negative/zero sequence.

The data transmission device of the present invention may be configured such that each of the electromagnetic signal sending unit and the electromagnetic signal detection unit includes a coil and the electromagnetic signal is a magnetic field signal sent and received by the coil.

The data transmission device of the present invention may be configured such that a transmission circuit connected to a transmission coil provided as the electromagnetic signal sending unit includes a current source capable of controlling amount and direction of current flowing in the transmission coil.

The data transmission device of the present invention may be configured such that the transmission circuit supplies a current signal, shaped by current switch-switching processing, to the transmission coil.

The data transmission device of the present invention may be configured such that the transmission circuit includes two sets of switching transistor pairs that can invert the direction of current.

The data transmission device of the present invention may be configured such that each of the electromagnetic signal sending unit and the electromagnetic signal detection unit includes an electrode used for capacitive coupling and the electromagnetic signal is an electric field signal sent and received via the electrode.

The data transmission device of the present invention may be configured such that the electromagnetic signal output from the electromagnetic signal sending unit is a voltage signal supplied to the electrode of the electromagnetic signal sending unit.

A semiconductor device of the present invention may include the data transmission device described above.

A semiconductor device of the present invention may comprise a first semiconductor chip that includes the electromagnetic signal sending unit in the data transmission device described above as a coil; and a second semiconductor chip that includes the electromagnetic signal detection unit in the data transmission device described above as a coil, wherein the first semiconductor chip and the second semiconductor chip are opposed in such a that central axes of the coils are aligned.

A data transmission method in another aspect of the present invention is a method for transmitting data in non-contact mode through electromagnetic induction between an electromagnetic signal sending unit and an electromagnetic signal detection unit that are opposed, wherein an electromagnetic signal, which is output from the electromagnetic signal sending unit, is substantially point symmetric with a point, at which amplitude of the electromagnetic signal crosses 0, as a symmetric point, and binary data is transmitted corresponding to whether a gradient at the symmetric point is positive or negative.

The data transmission method of the present invention may be a method in which the binary data is made to correspond to a change in the time differential value of the electromagnetic signal in a zero/positive/negative/positive/zero sequence or in a zero/negative/positive/negative/zero sequence.

The data transmission method of the present invention may be a method in which the waveform of the electromagnetic signal is composed of a combination of substantially (approximately) triangular waves.

The data transmission method of the present invention may be a method in which time differential value of the electromagnetic signal is approximately constant in a negative period when the time differential value of the electromagnetic signal changes in a zero/positive/negative/positive/zero sequence and in a positive period when the time differential value of the electromagnetic signal changes in a zero/negative/positive/negative/zero sequence.

The data transmission method of the present invention may be a method in which the electromagnetic signal is a magnetic field signal.

The data transmission method of the present invention may be a method in which the electromagnetic signal is an electric field signal.

According to the present invention, because an electromagnetic signal output from the electromagnetic signal sending means is point symmetric, the amplitude and the time-direction width, required for receiving the signal induced on the reception side, may be increased. This allows the received signal to be distinguished clearly from a noise signal, making it possible to receive the signal without noise effects. Reduction in signal fluctuation in the time direction at a transmission/reception time also allows data to be transmitted reliably. In addition, increased resistance to noises and increased resistance to time-direction fluctuation enable the signal to be transmitted even at a lower transmission power, thus reducing the power consumption of the device.

BRIEF DESCRIPTION OF THE DRAWINGS

FIGS. 1A and 1B are timing diagrams showing a data transmission method in an exemplary embodiment of the present invention.

FIGS. 2A and 2B are diagrams showing the simulation result indicating the transmission waveform in the conventional art.

FIGS. 3A and 3B are diagrams showing the simulation result (1) indicating the transmission waveform of the data transmission method in the exemplary embodiment of the present invention.

FIGS. 4A and 4B are diagrams showing the simulation result (2) indicating the transmission waveform of the data transmission method in the exemplary embodiment of the present invention.

FIGS. 5A and 5B are diagrams showing the simulation result indicating the transmission waveform when a signal is transmitted in the conventional art.

FIGS. 16A and 16B is a timing diagram showing a data transmission method using capacitive coupling in the exemplary embodiment of the present invention.

PREFERRED MODES

Figure 6:
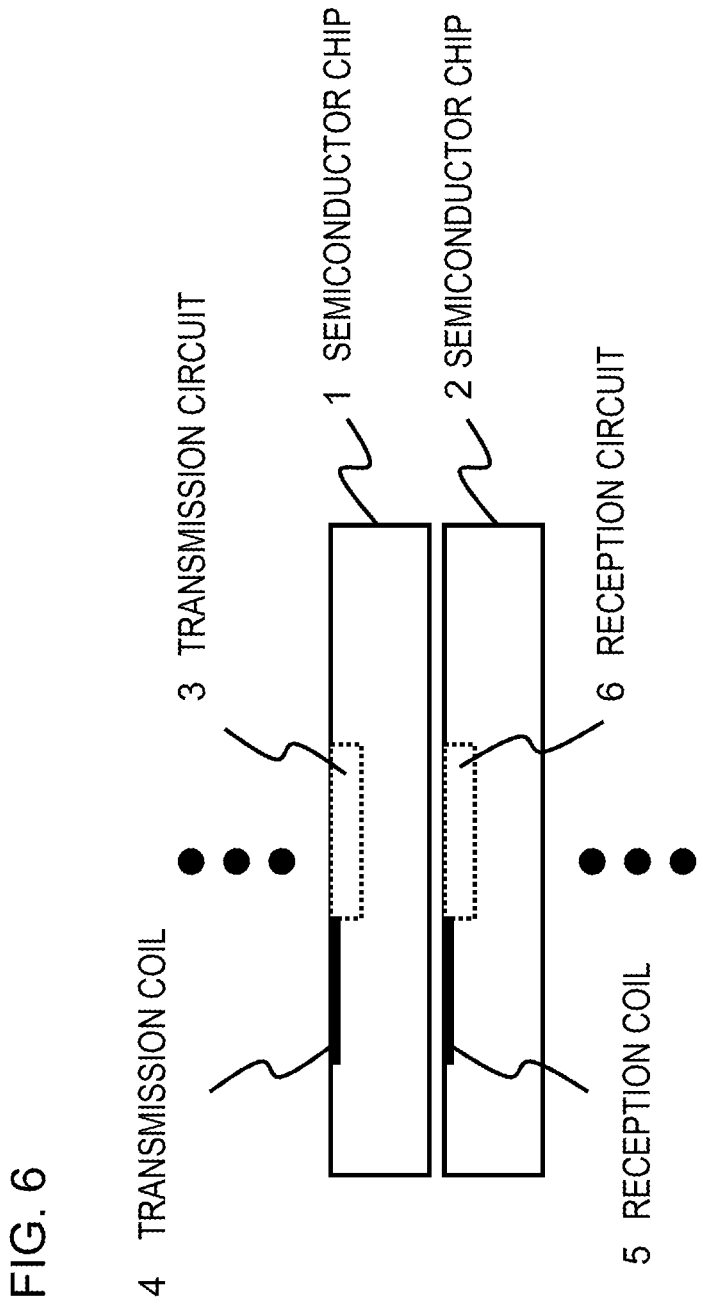
FIG. 6 is a cross section diagram showing the structure of the semiconductor device in the exemplary embodiment of the present invention.

A data transmission method in an exemplary embodiment of the present invention, which is a transmission method for transmitting data through electromagnetic induction between the opposed coils in non-contact mode, transmits data according to a change in the time differential value of the electromagnetic signal output from a transmission coil wherein the time differential value changes continuously in a positive/negative/positive sequence or continuously in a negative/positive/negative sequence.

Preferably, in the data transmission method, the intensity of the electromagnetic signal is 0 at the start and end of the electromagnetic signal output from the transmission coil.

Preferably, in the data transmission method, the electromagnetic signal output from the transmission coil is point symmetric or substantially point symmetric with a point, at which the electromagnetic signal output from the transmission coil is 0, as the symmetric point. Note that the term "substantially point symmetric" means that, when the time differential value of the electromagnetic signal changes in the positive/negative/positive sequence, the waveforms of the electromagnetic signal in the positive periods at both ends are not necessarily point symmetric. Similarly, when the time differential value of the electromagnetic signal output from the transmission coil changes in the negative/positive/negative sequence, the waveforms of the electromagnetic signal in the negative periods at both ends are not necessarily point symmetric.

Preferably, in the data transmission method, the waveform of the point symmetric or substantially point symmetric electromagnetic signal is composed of a combination of triangular waves or almost triangular waves.

Preferably, in the data transmission method, the time differential value of the electromagnetic signal is constant in the negative period of the time differential value of the electromagnetic signal when the time differential value of the electromagnetic signal output from the transmission coil changes in the positive/negative/positive sequence and in the positive period of the time differential value of the electromagnetic signal when the time differential value of the electromagnetic signal output from the transmission coil changes in the negative/positive/negative sequence.

Preferably, in the transmission method for transmitting data through electromagnetic induction between the opposed coils in non-contact mode, the time differential value of the current signal flowing in the transmission coil changes continuously in the positive/negative/positive sequence or continuously in the negative/positive/negative sequence.

Preferably, in the data transmission method, the current amount at the start and end of the current signal flowing in the transmission coil is 0.

Preferably, in the data transmission method, the current signal flowing in the transmission coil is point symmetric or substantially point symmetric with a point, at which the time differential value of the current signal flowing in the transmission coil is 0, as the symmetric point.

Preferably, in the data transmission method, the waveform of the point symmetric or substantially point symmetric current signal flowing in the transmission coil is composed of a combination of triangular waves or almost triangular waves.

Preferably, in the data transmission method, the time differential value of the current signal is constant in the negative period of the time differential value of the current signal when the time differential value of the current signal flowing in the transmission coil changes in the positive/negative/positive sequence and in the positive period of the time differential value of the current signal when the time differential value of the current signal flowing in the transmission coil changes in the negative/positive/negative sequence.

A semiconductor device in the exemplary embodiment of the present invention may transmit data using the data transmission method described above.

Preferably, in the semiconductor device, a transmission circuit connected to the transmission coil is a current source capable of controlling the current amount and the current direction.

Preferably, in the semiconductor device, the transmission circuit connected to the transmission coil supplies the current signal, shaped by current switch-switching processing, to the transmission coil.

That is, a data transmission method, which is a transmission method for transmitting data through electromagnetic induction between opposed coils in non-contact mode, transmits a signal according to whether the time differential value of the electromagnetic signal, which is output from the transmission coil, changes continuously in a positive/negative/positive sequence or continuously in a negative/positive/negative sequence. In this case, the time differential value of the current signal flowing in the transmission coil is characterized in that it changes continuously in a positive/negative/positive sequence or continuously in a negative/positive/negative sequence. The current waveform is more efficient if the current signal input to the transmission coil is point symmetric with a point, at which the current amount becomes 0, as the symmetric point either in the negative period of the time differential value of the current signal when the time differential value of the current signal input to the transmission coil changes in the positive/negative/positive sequence or in the positive period of the time differential value of the current signal when the time differential value of the current signal input to the transmission coil changes in the negative/positive/negative sequence. In the description below, a current signal waveform having this characteristic is called a point symmetric waveform. The point symmetric waveform may be the substantially point symmetric waveform described above.

In the transmission method for transmitting data through electromagnetic induction in non-contact mode, a voltage generated by differentiating the reception magnetic field is induced in the reception coil, which receives the magnetic field signal output from the transmission coil, according to the Faraday's law of electromagnetic induction. In the conventional art, when a rectangular wave digital signal is transmitted from the transmission coil directly as a magnetic field signal, a narrow pulse-width, steep-impulse waveform is induced in the reception coil by the differential processing described above and, because the waveform is very similar to that of a noise generated in the inside or outside of the semiconductor chip, it is difficult to distinguish between the noise and the reception signal. In addition, because the signal width that may be used at signal reception time is only a time corresponding to the transmission current increasing period or the transmission current decreasing time, a slight difference in the transmission signal time or in the reception system time may lead to the transmission of an erroneous signal.

In contrast, as compared to the conventional art, the present invention allows the time-direction signal width to be increased while sufficiently maintaining a large amplitude of the signal induced in the reception coil, easily implementing error-free data transmission.

The semiconductor device of the present invention comprises a transmission coil and a transmission circuit capable of supplying the current signal, which has the characteristics described above, to the transmission coil.

In addition, the transmission circuit is preferably a variable current source capable of controlling the current amount and the current direction, and the variable current source is preferably a switch inserted in series between the power supply and the transmission coil.

The semiconductor device of the present invention may be (i) a laminated semiconductor device having a reception coil (ii) multiple laminated semiconductor devices each having a reception coil or (iii) laminated semiconductors composed of multiple semiconductor devices each at least having a transmission coil and semiconductor device having a reception coil.

In the semiconductor device of the present invention, another semiconductor device may be laminated between a semiconductor device, which has a transmission coil and a transmission circuit, and a semiconductor device which has a reception coil. A reception coil need not be formed on the semiconductor device, for example, when a reception coil is formed on a printed circuit board and is connected to a semiconductor device that has a reception coil. It is only required that the transmission coil and the reception coil are laminated in the opposed positions.

Exemplary embodiments of the data transmission device and the data transmission method of the present invention will be described below more in detail with reference to the drawings. Note that the exemplary embodiments given below are examples of the present invention and that the present invention is not limited to the modes given by the description and the drawings. In a cross section diagram, hatching indicating a cross section is omitted for convenience.

First, the following describes the data transmission method. FIGS. 1A and 1B are timing diagrams showing the data transmission method in an exemplary embodiment of the present invention, FIG. 1A shows the waveform of the voltage signal induced in a reception coil, and FIG. 1B shows the waveform of the current signal flowing in a transmission coil.

In the data transmission method of the present invention, data is transmitted by continuously changing the time differential value of the current signal, which flows in the transmission coil, in the positive/negative/positive sequence or in the negative/positive/negative sequence. In this case, the amount of the current signal flowing in the transmission coil is increased continuously from a state in which no current flows to a state in which the current amount reaches Imax and, after the current amount reaches a predetermined current amount, the current is decreased until the current amount reaches 0, as shown in FIG. 1B. In addition, the current amount is increased so that the current flows in an opposite direction and, after the current amount reaches −Imax, the current is decreased until the current amount reaches 0.

When the signal having a point symmetric waveform flows in the transmission coil, the positive-direction voltage Vrx is induced in the reception coil according to the Faraday's law as shown in FIG. 1A while the value of the current flowing in the transmission coil is increasing. The magnitude of the voltage Vrx at this time is a value proportional to the change amount of the current. After that, when the current flowing in the transmission coil reaches Imax, the amount of current flowing in the transmission coil is switched from increase to decrease. Because the change amount of the current becomes negative at this time, a negative voltage is induced in the reception coil. At this time, the magnitude of the signal in this case is proportional to the change amount of the current as described above.

In the conventional art, the signal transmission is performed after the current starts to decrease and until the current amount reaches 0. In contrast, in the transmission method of the present invention, almost the same amount of current change continues even after the current amount reaches 0 and, from that point in time, the current starts to flow in a direction opposite to a direction in which the current flowed before the current amount reaches 0 and the opposite-direction current continues to flow until the current amount reaches −Imax. Because the current change remains in a state existing before the current amount reaches 0, almost the same intensity signal continues to be induced in the reception coil. After that, the current flowing in the transmission coil is stopped to set the current amount to 0. Because the signal induced at this time in the reception coil is proportional to the time change amount of the current flowing in the transmission coil, the signal is induced in the reception coil most efficiently when the time change amount of the current flowing in the transmission coil remains constant.

To confirm the effect of the present invention, FIGS. 2A and 2B show the result of simulation using a circuit simulator. In this simulation, the self-inductance and the mutual inductance of the transmission coil and the reception coil are calculated using a standard electromagnetic field analysis tool where the transmission/reception coil radius is 100 μm respectively and the transmission distance is 400 μm. Although the sizes are exemplary and the characteristics vary according to the coil radius and the transmission distance, the qualitative trend remains the same and the same effect may be attained even if the size varies.

FIG. 2A shows the voltage signal waveform of the signal induced in the reception coil when the triangular wave signal in the conventional art is used, and FIG. 2B shows the current signal waveform of the signal flowing in the transmission coil. On the other hand, FIG. 3A shows the voltage signal waveform of the signal induced in the reception coil when the point symmetric waveform of the present invention is used, and FIG. 3B shows the current signal waveform of the signal flowing in the transmission coil. In this case, the current signal waveform flowing in the transmission coil is adjusted so that the amplitude of the signal induced in the reception coil is almost the same as the time-direction width of the signal. Note that the power consumed for transmitting the signal is the time integration of the value of the current flowing in the transmission coil. The comparison between the current waveform of the present invention with that of the conventional art with reference to FIGS. 2A, 2B, 3A and 3B indicate that the power required by the transmission method of the present invention for inducing the signal in the reception coil is about half of the power required by the method in the conventional art. This means that the data transmission method of the present invention can reduce the power.

Next, the following describes the case in which the amount of current flowing in the transmission coil is limited by a limit on the power supply voltage and so on. If the current amount shown in FIG. 2B is the current amount allowed in the system, the amount of current exceeding the limit cannot be supplied. This limitation prevents the time-direction width of the signal, induced in the reception coil, from being increased any more and so a small operation time error, if generated, will result in the reception of an erroneous signal, meaning that data cannot be transmitted stably.

In contrast, the amount of current of the point symmetric waveform of the present invention, though limited, provides more flexibility as shown in FIG. 3B. This flexibility allows more current to be supplied as shown in FIG. 4B and allows the time-direction width to be increased as shown in FIG. 4A while retaining the amplitude of the signal induced in the reception coil.

In the triangular wave signal in the conventional art, too, the time-direction width of the signal, induced in the reception coil, may be increased by reducing by half the per-unit-time change amount of the current so that the change time, during which the current change occurs, of the current waveform flowing in the transmission coil is increased as shown in FIG. 5B. However, reducing the per-unit-time change amount of the current by half results in the reduction by half in the signal amplitude induced in the reception coil as shown in FIG. 5A. This reduction in the signal amplitude degrades the resistance to error in data transmission.

The analysis result given above indicates that the data transmission method of the present invention reduces the power required for signal transmission while retaining the amplitude and the time-direction width of the signal induced in the reception coil. The amount of current flowing in the transmission coil, if limited, allows the amplitude and the time-direction width of the signal, induced in the reception coil, to be retained, thus ensuring high resistance to error in data transmission.

(Semiconductor Device)

A semiconductor device in an exemplary embodiment of the present invention, which is a semiconductor device that transmits signals through electromagnetic induction, has a transmission circuit for generating the current signal waveform that flows in the transmission coil and that is a point symmetric waveform such as the one shown in FIGS. 1A and 1B. FIG. 6 is a cross section diagram of the semiconductor device in the exemplary embodiment of the present invention. This semiconductor device comprises semiconductor chips 1 and 2. The semiconductor chip 1 comprises a transmission circuit 3 and a transmission coil 4, and the semiconductor chip 2 comprises a reception circuit 6 and a reception coil 5. The semiconductor chips 1 and 2 are arranged in parallel so that electromagnetic induction may be performed between the transmission coil 4 and the reception coil 5, and data is transmitted between the transmission coil 4 and the reception coil 5 through electromagnetic induction. By aligning the central axis of the transmission coil 4 with the central axis of the reception coil 5, the reception coil 5 can receive the magnetic field from the transmission coil 4 at the maximum efficiency.

Although only two semiconductor chips 1 and 2 are shown in FIG. 6, three or more semiconductor chips may also be arranged one on top of the other. Although only the transmission device S (the device includes the transmission circuit 3 and transmission coil 4, and this configuration is assumed in the description below) is formed on the semiconductor chip 1, the reception device E (the device includes the reception circuit 6 and reception coil 5, and this configuration is assumed in the description below) may also be formed. In addition, the transmission device S (transmission circuit 3 and transmission coil 4) may also be formed on the semiconductor chip 2. Note that, in FIG. 6, emphasis is placed only on the transmission device S and the reception device E, which are the minimum requirements for an interface circuit of the present invention, and on the semiconductor chips 1 and 2 on which those devices are formed. Also note that the hatching indicating a cross section is omitted in the figure.

The transmission circuit 3 and the reception circuit 6 are formed using the transistors in each semiconductor chip. The transmission coil 4 and the reception coil 5 are formed in the wiring layer of each semiconductor chip. It is preferable that the laminated semiconductor chips 1 and 2 be bonded with a non-conductive bonding layer. If they are bonded with a conductive bonding layer, the magnetic field generated in the transmission coil 4 is blocked by this bonding layer and the magnetic field may not reach the reception coil 5.

Figure 7:
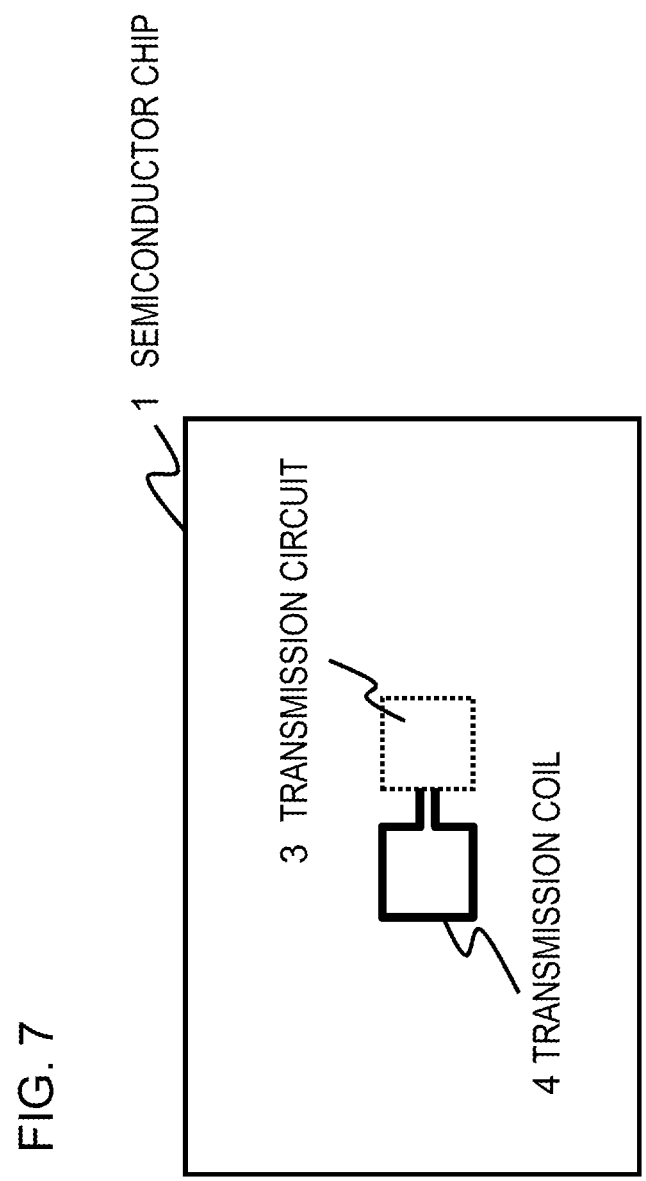
FIG. 7 is a top view of a semiconductor chip on which a transmission device composed of a transmission coil and a transmission circuit is formed.
Figure 8:
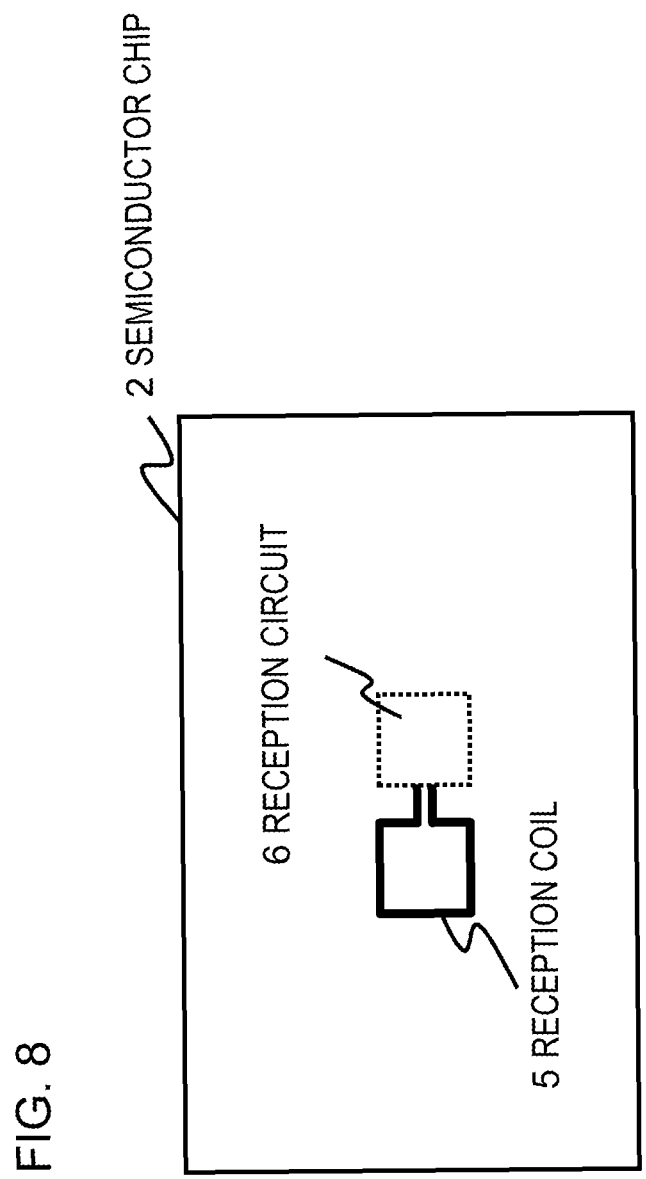
FIG. 8 is a top view of a semiconductor chip on which a reception device composed of a transmission coil and a transmission circuit is formed.

FIG. 7 is a top view of the semiconductor chip 1 on which the transmission device S composed of the transmission coil 4 and the transmission circuit 3 is formed. In this transmission device S, one transmission coil 4 is connected to one transmission circuit 3. FIG. 8 is a top view of the semiconductor chip 2 on which the reception device E composed of the transmission coil 5 and the transmission circuit 6 is formed. The positional relation between the transmission coil 4 and the transmission circuit 3 and between the reception coil 5 and the reception circuit 6 is not limited to the form shown in FIG. 7 and FIG. 8 but may be designed freely.

Figure 9:
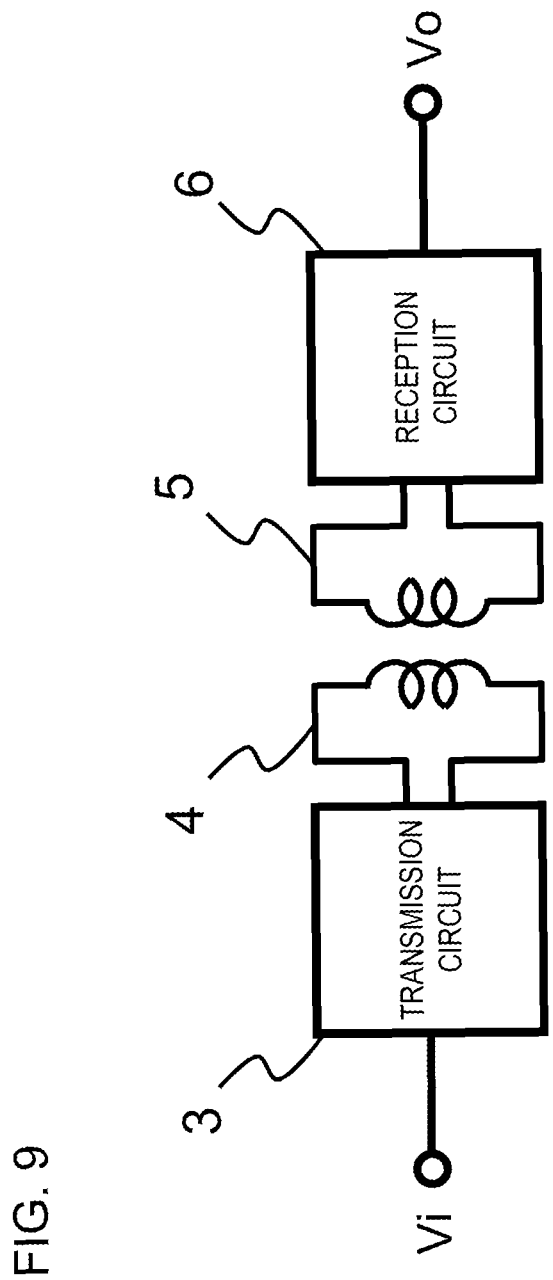
FIG. 9 is a block diagram showing an interface circuit having the transmission device and the reception device in the exemplary embodiment of the present invention.

FIG. 9 shows an example of the block diagram of an interface circuit having the transmission device S and the reception device E. As shown in FIG. 9, the interface circuit of the present invention basically comprises at least the transmission device S having the transmission circuit 3 and the transmission coil 4 and the reception device E having the reception coil 5 and the reception circuit 6. The current signal flowing in the transmission coil 4 has the point symmetric waveform, the magnetic field signal output from the transmission coil 4 is received by the reception coil 5, the reception circuit 6 receives the signal and, in this, data is transmitted.

(Shaping by Current Switch Switching Processing)

Next, the following describes a circuit that shapes the waveform of the current signal, which flows in the transmission coil, using the transmission circuit connected to the transmission coil, so that the polarity of the waveform changes in the positive/negative/positive sequence or in the negative/positive/negative sequence.

Figure 10:
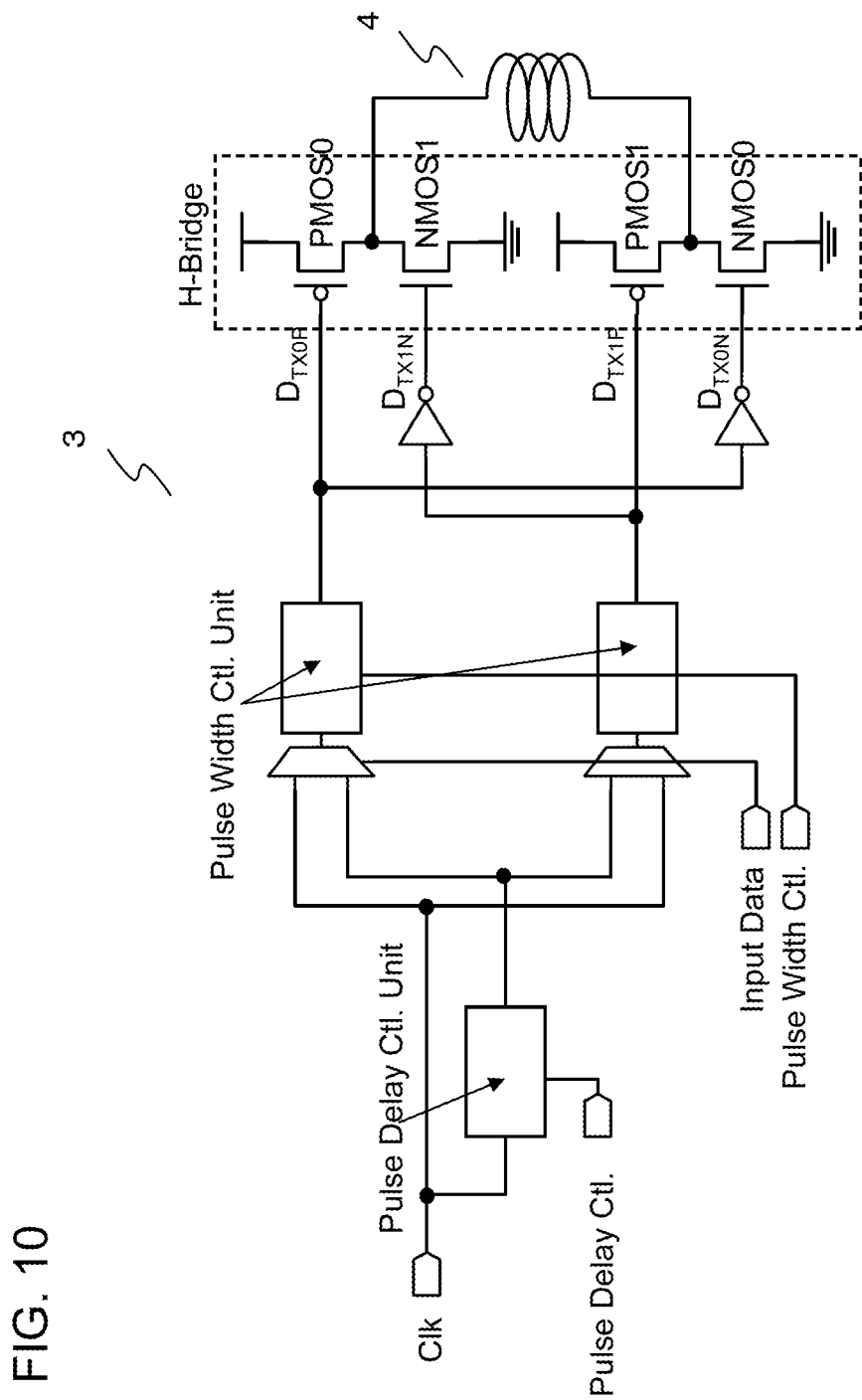
FIG. 10 is a circuit diagram showing the transmission circuit in the exemplary embodiment of the present invention.
Figure 11:
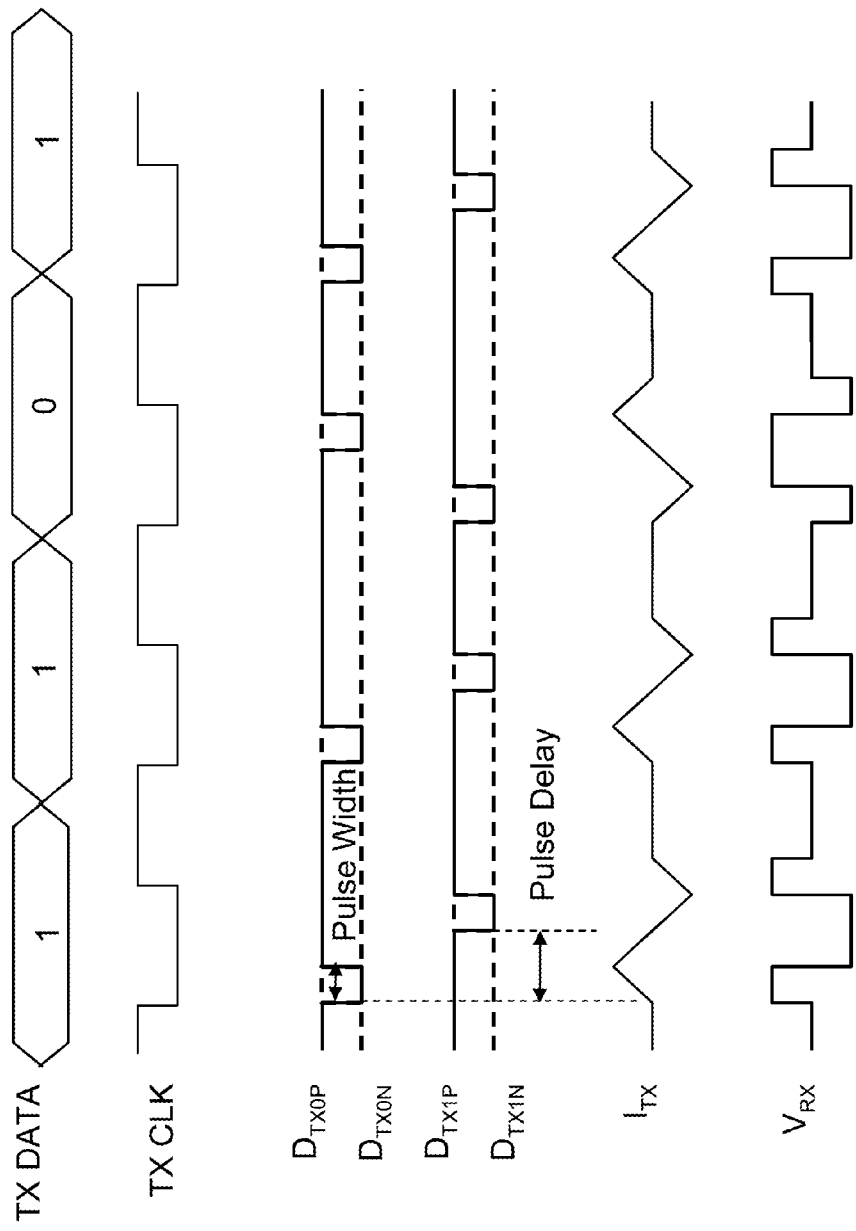
FIG. 11 is a timing diagram showing the operation of signals in the transmission circuit shown in FIG. 10 and signals induced in the reception coil.

FIG. 10 is a circuit diagram showing an example of the transmission circuit having a current switch switching processing circuit. FIG. 11 shows an example of the timing diagram of the transmission circuit shown in FIG. 10. The transmission circuit comprises transistors PMOS0, PMOS1, NMOS0, and NMOS1 connected to the transmission coil and the circuits that control the gate voltages of those four transistors. Each of transistor pair 0 composed of PMOS0 and NMOS0 and transistor pair 1 composed of PMOS1 and NMOS1 has their drains connected to different terminals of the transmission coil as shown in FIG. 10, the source terminals of the PMOS transistors are connected to the power supply, and the source terminals of the NMOS transistors are grounded. The signals that control the gate terminal of the PMOS transistor and the gate terminal of the NMOS transistor of each pair are controlled so that they have opposite polarities. That is, each transistor pair is turned on at the same time and, when the transistor pair is on, the current flows from the power supply via the transmission coil. The timing diagram in FIG. 11 is based on the assumption that the polarity is positive when the current flows from top to bottom in the transmission coil 4 in FIG. 10 and is negative when the current flows from bottom to top and that the polarity of the current is positive when the transmission data is at a high level ("1") and is negative when the transmission data is at a low level ("0").

When the transmission data is "1", the control signals $D_{TX0P}$ and $D_{TX0N}$, which control transistor pair 0, change from "1" to "0" and from "0" to "1" respectively to turn on transistor pair 0 to cause the current to flow in the transmission coil in the positive direction. After that, when the control signals $D_{TX0P}$ and $D_{TX0N}$ return to "1" and "0" respectively, transistor pair 0 is disconnected and the current flowing in the transmission coil becomes 0. Next, when the control signals $D_{TX1P}$ and $D_{TX1N}$, which control transistor 1, change from "1" to "0" and from "0" to "1" respectively, to turn on transistor pair 1 to cause the current to flow in the transmission coil in the negative direction. After that, when the control signals $D_{TX1P}$ and $D_{TX1N}$ return to "1" and "0" respectively, transistor pair 1 is disconnected and the current flowing in the transmission coil becomes 0. The transistor operation described above generates the current signal whose polarity changes in the positive/negative/positive sequence.

When the transmission data is "0", the control signals $D_{TX0P}$, $D_{TX0N}$, $D_{TX1P}$, and $D_{TX1N}$ are changed in such a that the operation is performed in the order of transistor pair 1 and transistor pair 0, that is, in the reverse order when the transmission data is "1", to generate the current signal.

Changing the control signals $D_{TX0P}$, $D_{TX0N}$, $D_{TX1P}$, and $D_{TX1N}$ according to the transmission data in this controls the operation of transistor pair 0 and transistor pair 1, allowing the waveform to be shaped in such a way that the polarity of the waveform of the current flowing in the transmission coil 4 changes in the positive/negative/positive sequence or in the negative/positive/negative sequence.

Figure 12:
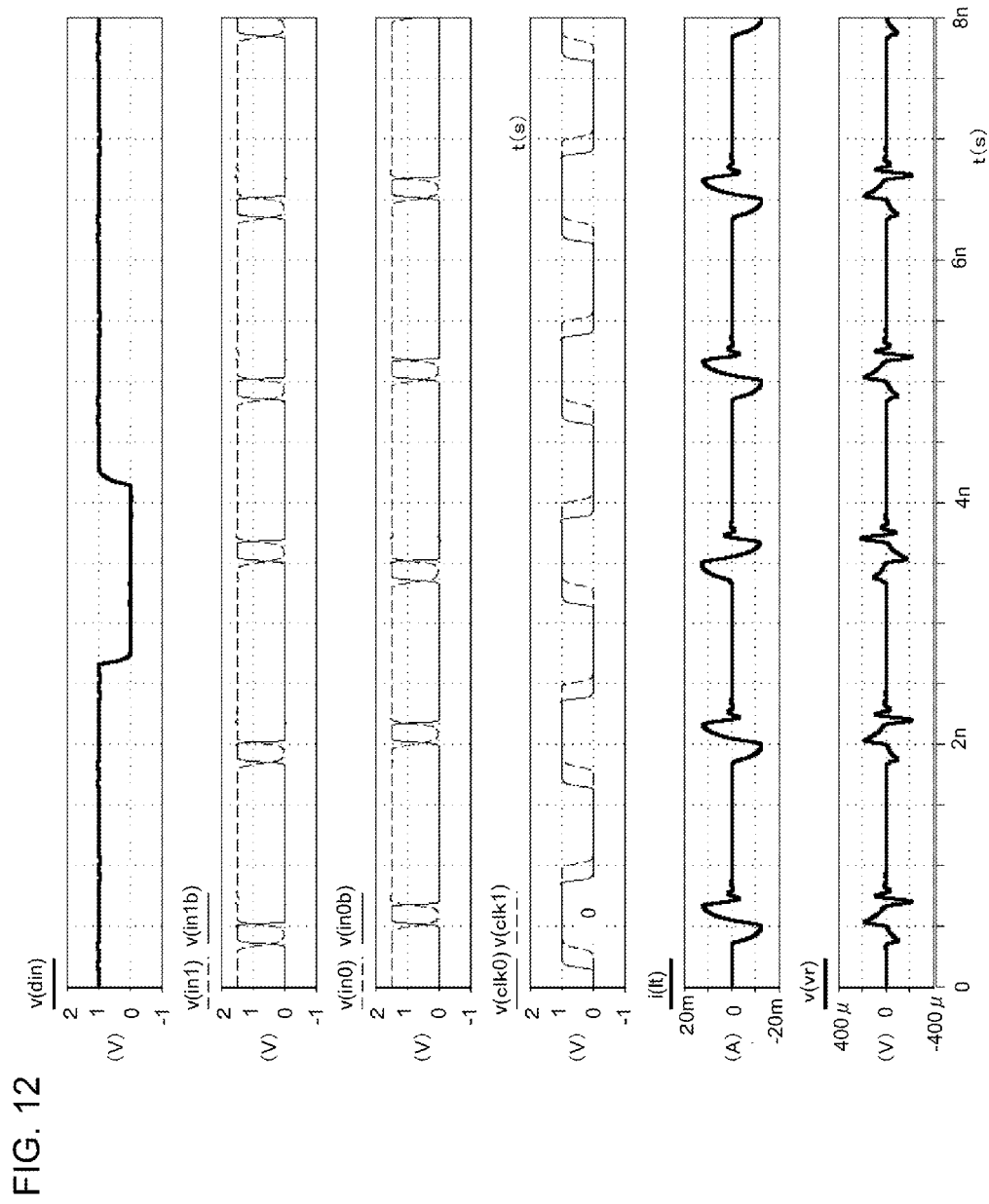
FIG. 12 is a diagram showing the simulation result of the signals in the transmission circuit shown in FIG. 10 and the signals induced in the reception coil.

FIG. 12 shows the result of circuit simulation carried out for confirming the effect of the transmission circuit of the present invention. FIG. 12 indicates that the transmission circuit causes the waveform to flow in the transmission coil where, according to the present invention, the polarity of the waveform changes in the positive/negative/positive sequence or in the negative/positive/negative sequence and that a sufficiently strong signal is induced in the reception coil.

Next, the following describes a control method for shaping the waveform into the point symmetric waveform described above. The source-drain current Id of a transistor may be controlled by the gate voltage Vgs shown by the expression below.

$$Id=k(Vgs-Vt)^2$$

where k is a constant and Vt is the threshold voltage of the transistor.

The waveform may be shaped into a desired point symmetric waveform by controlling the gate voltage according to the expression given above. For maximum transmission efficiency, the gate voltage must be controlled based on a quadratic function such as the one given above but a desired effect may also be obtained by controlling the gate voltage using a signal having a predetermined gradient.

Figure 13:
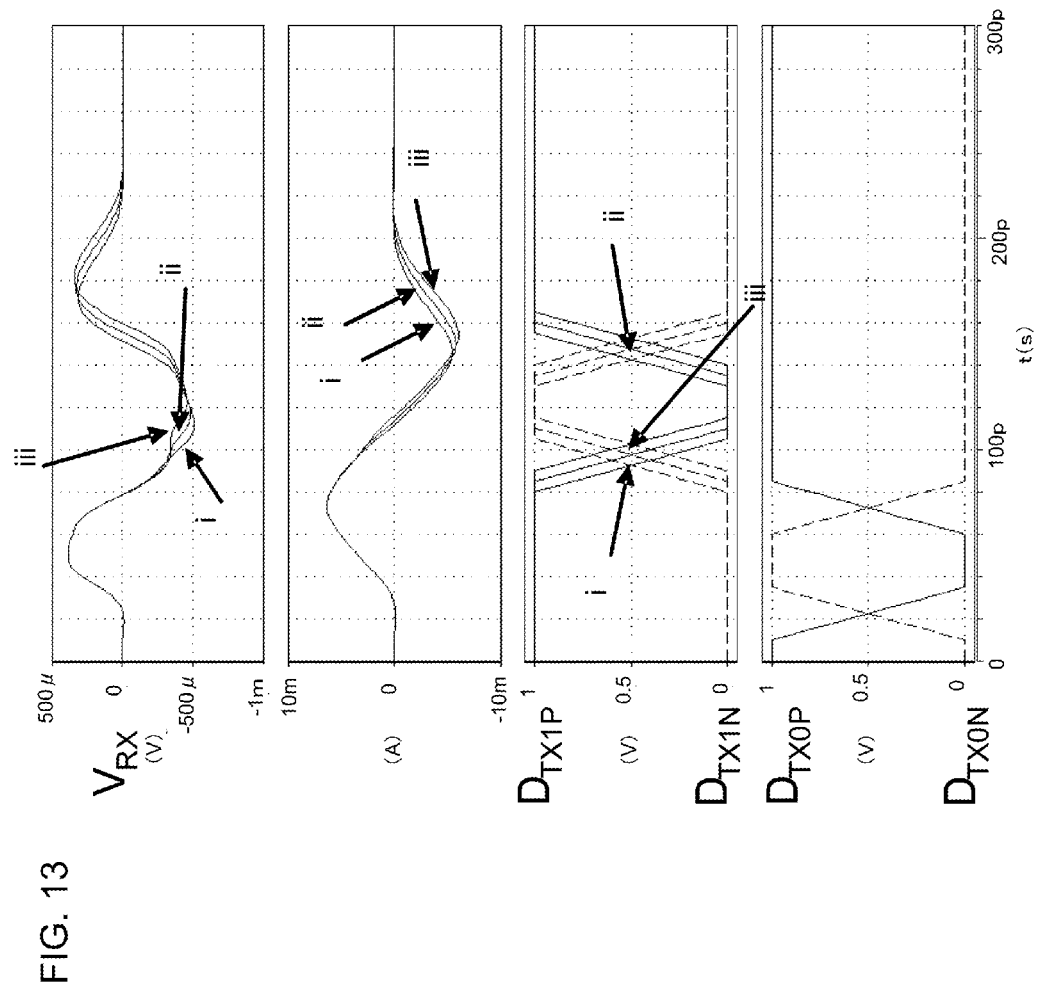
FIG. 13 is a diagram showing the circuit simulation result carried out for confirming that a point symmetric waveform is generated.

FIG. 13 shows a result of circuit simulation carried out to confirm that the point symmetric waveform is generated by controlling the gate voltage Vgs of each transistor to allow it to have a predetermined gradient. The figure shows the following three cases; the signal for controlling transistor pair 0 and the signal for controlling transistor pair 1 are separated (iii), synchronized (ii), and overlapped (i). Because the current change becomes unstable and the reception signal is diminished when the control signals are separated too much as shown in FIG. 13, the control signal should be synchronized or somewhat overlapped to achieve an optimal effect. By controlling the transmission circuit with the control signal having a predetermined gradient such as the one shown in the figure, the point symmetric transmission current waveform of the present invention may be implemented.

Figure 14:
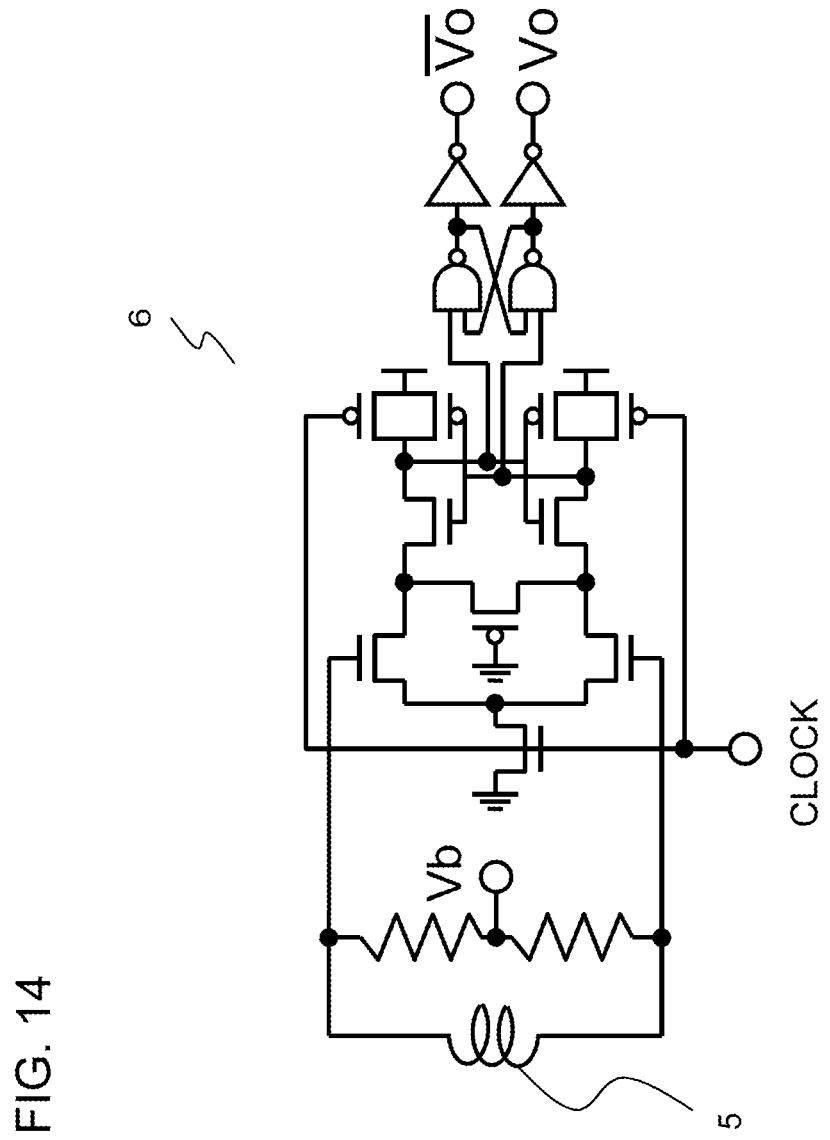
FIG. 14 is a circuit diagram of the reception circuit in the exemplary embodiment of the present invention.

FIG. 14 shows an example of the reception circuit. The reception circuit shown in FIG. 14 is only an example of the reception circuit, and the reception circuit may have another configuration in which the signal change induced in the reception coil can be observed and data can be restored.

As described above with reference to the timing diagrams shown in FIGS. 1A, 1B, 11 and 12 and the circuit simulation result, the time-direction width and the amplitude of the signal, induced in the reception coil, may be increased by generating the current signal, which flows in the transmission coil 4, as a point symmetric waveform. As a result, this configuration reduces the power consumption required for signal transmission and, at the same time, implements noise-resistant data transmission.

In the above description, a magnetic field signal is used to generate electromagnetic induction for use in signal transmission. However, the present invention is not limited to signal transmission by a magnetic field signal but an electric field signal may also be used. That is, a current signal is used to generate electromagnetic induction by a magnetic field signal while a voltage signal is used to generate electromagnetic induction by an electric field signal (capacitive coupling) for configuring a similar interface circuit via capacitive coupling between electrodes. In that case, the voltage signal induced at the reception electrode is proportional to the time differential value of the voltage signal at the transmission electrode.

Figure 15:
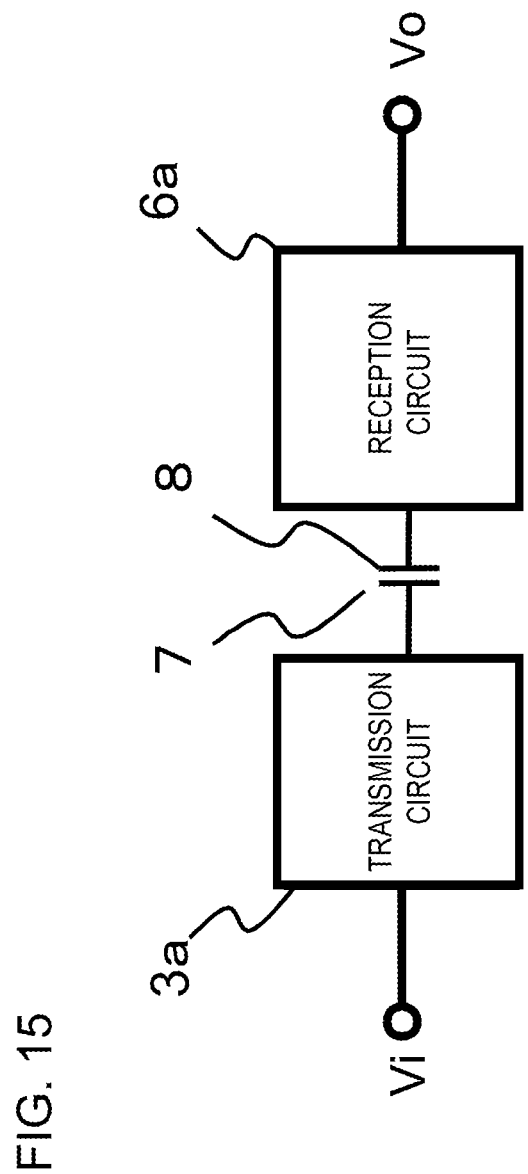
FIG. 15 is a block diagram showing the interface circuit for signal transmission using capacitive coupling in the exemplary embodiment of the present invention.
Figure 17A:
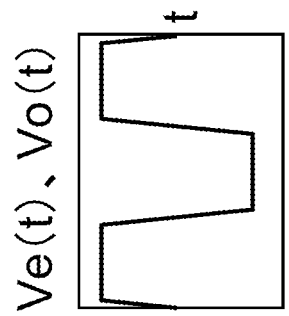
FIGS. 17A, 17B and 17C are diagrams showing the signal waveform in the transmission coil and the signal waveform induced in the reception coil in the conventional art.
Figure 17B:
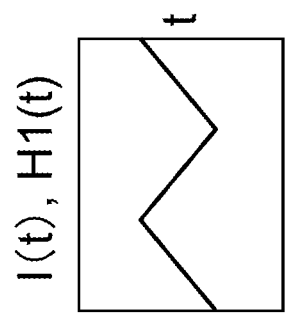
Figure 17C:
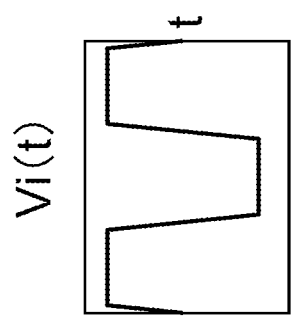

FIG. 15 is a block diagram showing an interface circuit for signal transmission using capacitive coupling. In FIG. 15, a transmission circuit 3a drives an electrode (transmission electrode) 7 in response to the input signal Vi. A reception circuit 6a is connected to an electrode (reception electrode) that is capacitive coupled to the electrode 7, and the reception circuit 6a receives the reception signal induced at the electrode 8 and outputs it as the output signal Vo. FIG. 16 is a diagram showing the waveforms in the interface circuit. The reception signal corresponding to the differential value of the voltage signal, which drives the transmission electrode, is induced at the reception electrode.

Thus, the present invention is applicable not only to signal transmission by a magnetic field signal but also to signal transmission via capacitive coupling.

(Use Mode of Interface Circuit)

Next, the following describes the use mode of the interface circuit of the present invention. In the semiconductor device in the exemplary embodiment of the present invention shown in FIG. 6, the magnetic field signal generated by the transmission coil 4 is transmitted through the chip, on which the transmission coil 4 is formed, to the reception coil 5. Note that however the configuration is not limited to the one shown in the figure but that the configuration in which the transmission coil 4 and the reception coil 5 are directly opposed may also be used. Such a configuration reduces the distance between the transmission coil and the reception coil, resulting in reduction in the power used for data transmission.

In the semiconductor device shown in FIG. 6 where the circuit chips are overlapped, the transmission coil 4 is placed on one circuit chip, and the reception coil 5 on the other circuit chip, at the positions corresponding each other. In addition to this configuration, when a signal is sent to or received from a device external to the semiconductor device, another configuration is also possible in which the circuit chips are overlapped with and the transmission coils or the reception coils placed in the positions corresponding each other when viewed in the see-through mode. For example, for use when externally monitoring the operation of the circuit chips in the semiconductor device, such a configuration corresponds to the configuration in which a transmission coil, which transmits the signal to a reception coil external to the semiconductor device, is provided in each circuit chip separately from the transmission coil used for signal transmission between the circuit chips. On the other hand, for use when externally controlling the test operation of the semiconductor device, such a configuration corresponds to the configuration in which a reception coil, which receives the signal from a transmission coil external to the semiconductor device, is provided in each circuit chip separately from the reception coil used for signal transmission between the circuit chips. The transmission coil and reception coil and the transmission device and the reception device, if provided for operation monitoring or test operation, would make easier the monitoring operation and the test operation for those not only on the surface layer but also in an inner layer of the laminated circuit chips.

Although two circuit chips are overlapped in the example of the semiconductor device shown in FIG. 6, not only two but also three or more semiconductor chips may also be overlapped. In addition, signals may be transmitted not only between the circuit chips adjacent vertically as shown in FIG. 6 but also between the circuit chips provided on the adjacent circuit chips. In general, when a signal is transmitted to the multiply-laminated circuit chips in the non-contact mode, there is a possibility that noises generated in the intervening circuit chips are introduced into the signal between the time the magnetic field signal leaves the interface chip and the time it reaches the farthest circuit chip or that a long communication distance decreases the signal amplitude. Despite those problems, the present invention ensures reliable data transmission because the signal amplitude may be increased while retaining the time-direction width of the signal induced in the reception coil as described above.

In the conventional art, when a reception coil is connected to a reception circuit with the reception coil outside the chip on which the reception circuit is provided, the signal induced in the reception coil is too weak to reliably transmit the signal due to the wire resistance between the reception coil and the reception circuit. On the other hand, the present invention induces a sufficiently strong signal in the reception coil and therefore eliminates the need to place the transmission coil and the transmission circuit, and the reception coil and the reception circuit, on the same chip as shown in FIG. 7 and FIG. 8 but allows them to be provided outside the chip.

In the above description, the semiconductor devices of the present invention are shown in the same size for convenience. Note that the size of the semiconductor device is not limited to the size of the circuit chip shown in the figures but that the circuit chips are only required to be overlapped such that the transmission coil and the reception coil are opposed.

The disclosures of Patent Documents and so on given above are hereby incorporated by reference into this description. The exemplary embodiments and the examples may be changed and adjusted in the scope of the entire disclosure (including claims) of the present invention and based on the basic technological concept. In the scope of the claims of the present invention, various disclosed elements may be combined and selected in a variety of ways. That is, it is to be understood that the present invention includes modifications and corrections that may be made by those skilled in the art in the scope of the entire disclosure including claims and based on the technological concept.

What is claimed is:

1. A data transmission device, comprising:
a data sending device that includes an electromagnetic signal sending unit, wherein
said data sending device is configured to output binary data in such a polarity that an electromagnetic signal, which is output from said electromagnetic signal sending unit, is substantially point symmetric with a point, at which amplitude of the electromagnetic signal crosses 0, as a symmetric point, and
the binary data are output corresponding to whether a gradient at the symmetric point is positive or negative,
wherein the data sending device is configured to output the electromagnetic signal having a change in a time differential value in a zero/positive/negative/positive/zero sequence when outputting one bit value of the binary data and to output the electromagnetic signal having a change in a time differential value in a zero/negative/positive/negative/zero sequence when outputting another bit value of the binary data.

2. The data transmission device as defined by claim 1, further comprising a data reception device that includes an electromagnetic signal detection unit, wherein
said electromagnetic signal sending unit and said electromagnetic signal detection unit are configured to be faced and to perform data transmission through electromagnetic induction in non-contact mode.

3. The data transmission device as defined by claim 1, wherein said data sending device outputs the electromagnetic signal, which has a waveform composed of a combination of substantially triangular waves, from said electromagnetic signal sending unit.

4. The data transmission device as defined by claim 1, wherein time differential value of the electromagnetic signal is approximately constant in a negative period when the time differential value of the electromagnetic signal changes in a zero/positive/negative/positive/zero sequence and in a positive period when the time differential value of the electromagnetic signal changes in a zero/negative/positive/negative/zero sequence.

5. The data transmission device as defined by claim 2, wherein each of said electromagnetic signal sending unit and said electromagnetic signal detection unit includes a coil and the electromagnetic signal is a magnetic field signal sent and received by the coil.

6. The data transmission device as defined by claim 4, wherein a transmission circuit connected to a transmission coil provided as said electromagnetic signal sending unit includes a current source capable of controlling amount and direction of current and direction flowing in said transmission coil.

7. The data transmission device as defined by claim 5, wherein said transmission circuit supplies a current signal, shaped by current switch-switching processing, to said transmission coil.

8. The data transmission device as defined by claim 5, wherein said transmission circuit is configured to include two sets of switching transistor pairs that can invert the direction of current.

9. The data transmission device as defined by claim 2, wherein each of said electromagnetic signal sending unit and said electromagnetic signal detection unit includes an electrode used for capacitive coupling and the electromagnetic signal is an electric field signal sent and received via said electrode.

10. The data transmission device as defined by claim 8, wherein the electromagnetic signal output from said electromagnetic signal sending unit is a voltage signal supplied to the electrode of said electromagnetic signal sending unit.

11. A semiconductor device, comprising the data transmission device as defined by claim 1.

12. A semiconductor device, comprising:
a first semiconductor chip that includes said electromagnetic signal sending unit in said data transmission device, as defined by claim 4, as a coil; and
a second semiconductor chip that includes said electromagnetic signal detection unit in said data transmission device, as defined by claim 4, as a coil;
wherein said first semiconductor chip and said second semiconductor chip are faced in such a way that central axes of the coils are aligned.

13. A data transmission method for transmitting data in non-contact mode through electromagnetic induction between an electromagnetic signal sending unit and electromagnetic a signal detection unit that are faced, wherein
an electromagnetic signal, which is output from said electromagnetic signal sending unit, is substantially point symmetric with a point, at which amplitude of the electromagnetic signal crosses 0, as a symmetric point, and
wherein the method comprises transmitting binary data corresponding to whether a gradient at the symmetric point is positive or negative, and
the transmitting the binary data comprises transmitting the electromagnetic signal having a change in a time differential value in a zero/positive/negative/positive/zero sequence when outputting one bit value of the binary data and transmitting the electromagnetic signal having a change in a time differential value in a zero/negative/positive/negative/zero sequence when outputting another bit value of the binary data.

14. The data transmission method as defined by claim 13, wherein a waveform of the electromagnetic signal is composed of a combination of substantially triangular waves.

15. The data transmission method as defined by claim 13, wherein time differential value of the electromagnetic signal is approximately constant in a negative period when the time differential value of the electromagnetic signal changes in a zero/positive/negative/positive/zero sequence and in a positive period when the time differential value of the electromagnetic signal changes in a zero/negative/positive/negative/zero sequence.

16. The data transmission method as defined by claim 13, wherein the electromagnetic signal is a magnetic field signal.

17. The data transmission method as defined by claim 13, wherein the electromagnetic signal is an electric field signal.

* * * * *